(12) United States Patent
Hayashi et al.

(10) Patent No.: US 6,966,538 B2
(45) Date of Patent: Nov. 22, 2005

(54) GATE VALVE

(75) Inventors: Yuzo Hayashi, Tokyo (JP); Tatsuo Saito, Tokyo (JP); Manabu Yabe, Tokyo (JP); Masaharu Nakagawa, Tokyo (JP)

(73) Assignee: Irie Koken Co., Ltd., Tokyo (JP)

( * ) Notice: Subject to any disclaimer, the term of this patent is extended or adjusted under 35 U.S.C. 154(b) by 34 days.

(21) Appl. No.: 10/796,211

(22) Filed: Mar. 10, 2004

(65) Prior Publication Data

US 2005/0092953 A1   May 5, 2005

(30) Foreign Application Priority Data

Nov. 4, 2003   (JP) .............................. 2003-374157

(51) Int. Cl.[7] ................................................ F16K 1/16
(52) U.S. Cl. ...................... 251/302; 251/327; 251/187; 251/195
(58) Field of Search ............................... 251/158, 187, 251/193, 195, 204, 302, 327

(56) References Cited

U.S. PATENT DOCUMENTS 5,626,324 A * 5/1997 Nakamura et al. ............ 251/58
6,095,741 A * 8/2000 Kroeker et al. ............. 414/217
6,390,449 B1 * 5/2002 Ishigaki et al. ............. 251/193

* cited by examiner

Primary Examiner—Edward K. Look
Assistant Examiner—John K. Fristoe, Jr.
(74) Attorney, Agent, or Firm—Wenderoth, Lind & Ponack, L.L.P.

(57) ABSTRACT

A gate valve has a valve rod equipped with a valve plate having a pair of valve plate surfaces, wherein the valve rod is tilted by an actuator to thereby effect highly reliable valve opening/closing operation with a simple construction. In the gate valve, the valve rod, which is equipped with the valve plate with the pair of valve plate surfaces, is rotatably supported, and raised and lowered by a raising/lowering cylinder, the valve rod being tilted by an actuator, a combination of a cam member and a cam raising/lowering cylinder, a combination of a driving block and a cylinder, or a combination of a connection member and a driving device (not shown) to thereby effect valve opening/closing with the pair of valve plate surfaces.

2 Claims, 13 Drawing Sheets

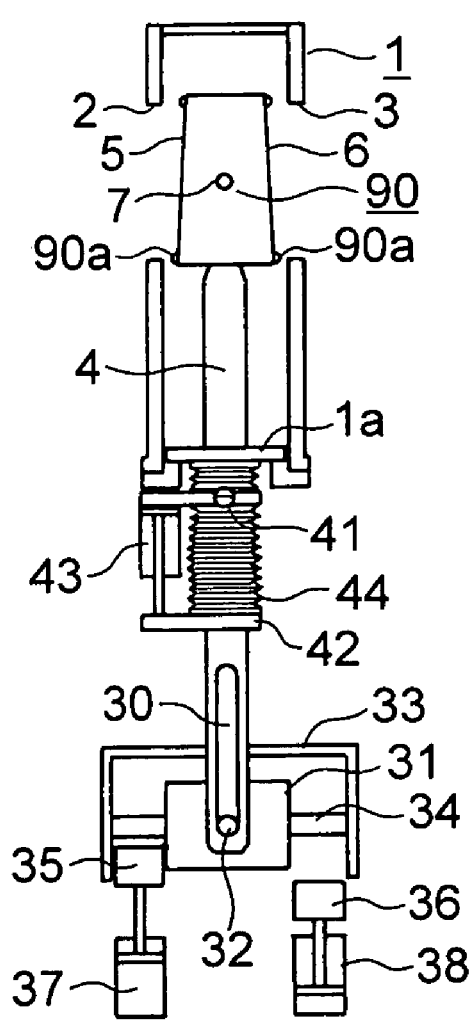
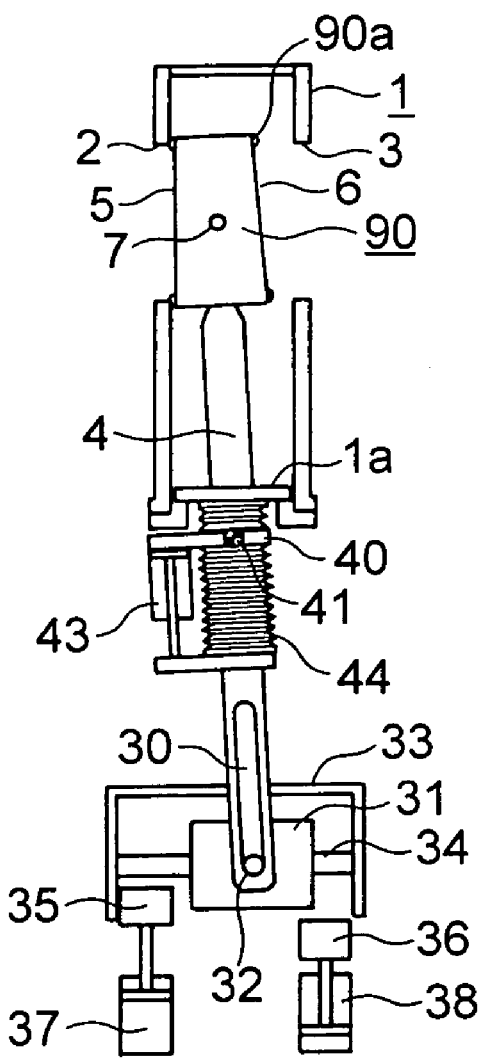

(FOURTH EMBODIMENT)

(FIFTH EMBODIMENT)

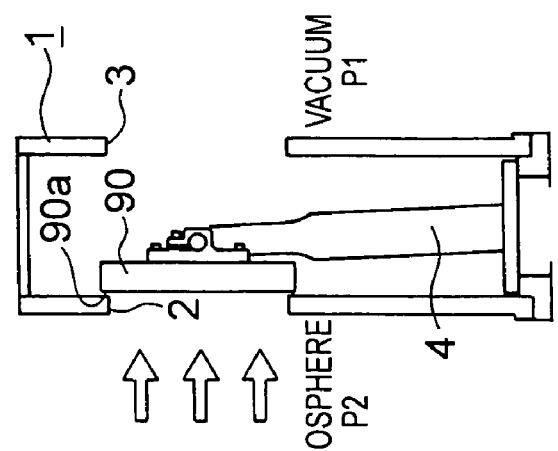
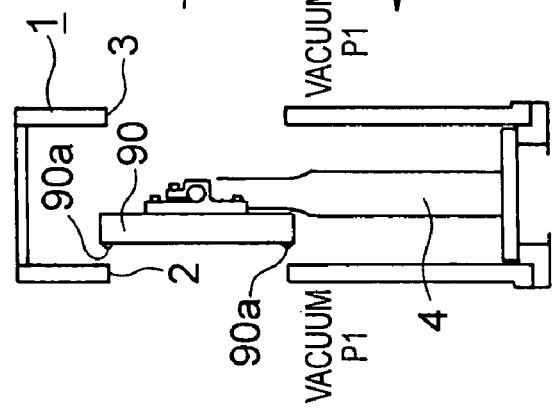
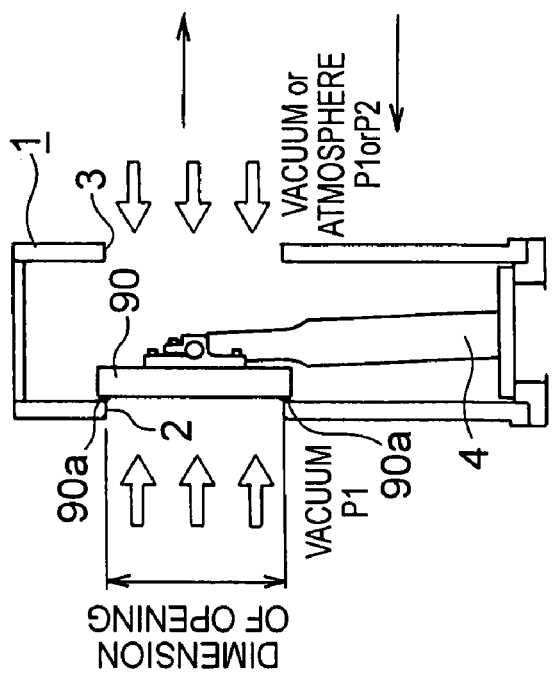

GATE VALVE

BACKGROUND OF THE INVENTION

1. Field of the Invention

The present invention relates to a gate valve, and more particularly to a novel technique for effecting the opening and closing of a large opening for conveyance of a large member such as a liquid crystal panel in a non-sliding manner and with ease.

2. Description of the Related Art

JP 08-42715 A and JP 10-10834 A disclose conventional examples of such a gate valve for large openings.

In the example shown in FIG. 14A through 14C, a construction is adopted, in which a valve plate provided on a valve rod is laterally tilted.

In this example, only one of openings 2 and 3 of a valve box 1 is opened and closed by using one side of a single valve plate 90, and tilting movement and vertical movement of a valve rod 4 are effected by means of a complicated cam.

The conventional gate valve, constructed as described above, has the following problem. That is, since the vertical movement and tilting movement of the valve rod are effected by means of a complicated cam, a rather complicated cam mechanism is involved. Further, the valve plate, provided for an opening of a large valve box, has a large weight, resulting in a large valve size and high cost.

Further, since the opening is opened and closed by using solely one side of the valve plate, it is rather difficult to maintain the durability of the O-ring, which means that it is not easy to attain the requisite level of reliability and that the maintenance cost is rather high.

SUMMARY OF THE INVENTION

A gate valve according to the present invention includes: a valve rod provided so as to be capable of rotating a valve plate having first and second tapered valve plate surfaces capable of ascending and descending in a valve box having first and second openings; a rotatably-supporting member for rotatably supporting the valve rod; a raising/lowering cylinder provided on the rotatably-supporting member and adapted to raise and lower the valve rod; a pin engaged with an elongated hole of the valve rod; a lateral actuator having the pin and capable of reciprocating in a lateral direction perpendicular to the longitudinal direction of the rod; first and second stoppers provided on the sides of the lateral actuator; and first and second lock cylinders connected to the first and second stoppers, and in the gate valve: one of the lock cylinders is operated, with the valve rod raised by the raising/lowering cylinder, to thereby cancel the engagement between the second stopper and the lateral actuator; and by laterally moving the lateral actuator, the valve rod is tilted to thereby put one of the first and second valve plate surfaces onto one of the first and second openings to close the gate valve. Further, in the gate valve, the lateral actuator is guided by a lateral bar provided in a fixedly arranged frame member, and the first and second stoppers are arranged between the side portions of the lateral actuator and the frame member. Further, a gate valve according to the present invention includes: a valve rod provided so as to be laterally movable in a valve box having first and second openings and so as to be capable of rotating a valve plate having first and second tapered valve plate surfaces; a rotatably-supporting portion provided outside the valve box so as to rotatably support the valve rod; and an actuator having a rod connected to a lower portion of the valve rod through the intermediation of a lower rotatably-supporting portion, and in the gate valve, by laterally moving the rod of the actuator, the valve plate surfaces are tilted, and one of the first and second openings is closed or opened with one of the first and second valve plate surfaces. Further, a gate valve according to the present invention includes: a valve rod provided so as to be laterally movable in a valve box having first and second openings and so as to be capable of rotating a valve plate having first and second tapered valve plate surfaces; a rotatably-supporting portion provided outside the valve box so as to rotatably support the valve rod; a protrusion provided on a lower portion of the rod; a raising/lowering cylinder for raising and lowering the valve rod; a first cam member with a first cam hole engaged with the protrusion; a second cam member with a second cam hole engaged with the protrusion; a first cam raising/lowering cylinder for raising and lowering the first cam member; and a second cam raising/lowering cylinder for raising and lowering the second cam member, and in the gate valve, by selecting between the raising and lowering of the first and second cam members, the first and second valve plate surfaces are tilted to close or open one of the first and second openings with one of the first and second valve plate surfaces. Further, in the gate valve: the cam members are arranged in a state in which they are stacked together; and the first and second cam raising/lowering cylinders are arranged at positions differing from each other. Further, a gate valve according to the present invention includes: a valve rod provided so as to be laterally movable in a valve box having first and second openings and so as to be capable of rotating a valve plate having first and second tapered valve plate surfaces; a rotatably-supporting portion provided outside the valve box so as to rotatably support the valve rod; a first cylinder arranged below the valve rod and having a first driving block; and a second cylinder arranged below the valve rod and having a second driving block, and in the gate valve, the first and second cylinders are selectively driven to put one of the first and second driving blocks onto a lower side portion of the valve rod, thereby tilting the valve rod to close or open one of the first and second openings with one of the first and second valve plate surfaces. Further, a gate valve according to the present invention includes: a valve rod provided so as to be laterally movable in a valve box having first and second openings and so as to be capable of rotating a valve plate having first and second tapered valve plate surfaces; a rotatably-supporting portion provided outside the valve box so as to rotatably support the valve rod; a connection member connected to a lower portion of the valve rod through the intermediation of a lower rotatably-supporting portion; a base rotatably-supporting portion for rotatably supporting a base portion of the connection member; and a connection member driving means for rotating the connection member, and in the gate valve, the valve rod is tilted through rotation of the connection member to thereby close or open one of the first and second openings with one of the first and second valve plate surfaces.

The gate valve of the present invention, constructed as described above, provides the following advantage.

Due to the construction in which a valve plate with a pair of tapered valve plate surfaces is rotatably supported with respect to a valve rod and in which the valve rod is caused to ascend, descend, and tilt solely by an actuator consisting of a cylinder or by a combination of a cylinder and a simple cam plate, it is possible, with a very simple structure, to freely open and close either of a pair of openings of a valve box by using the pair of valve plate surfaces, thereby making is possible to attain a high level of reliability.

BRIEF DESCRIPTION OF THE DRAWINGS

In the accompanying drawings:

FIGS. 2C and 2D are schematic diagrams further illustrating the operation of the gate valve shown in FIGS. 1A and 1B;

FIGS. 14A through 14C are explanatory diagrams illustrating the operation of a conventional gate valve in contrast with that of the gate valve shown in FIGS. 13A through 13C.

DETAILED DESCRIPTION OF THE PREFERRED EMBODIMENTS

According to the present invention, a valve plate with a pair of tapered valve plate surfaces is rotatably provided on a valve rod, and the pair of valve plates are put onto either of a pair of openings by an actuator like a cylinder or by a combination of a cam plate and a cylinder or the like, thereby making it possible to achieve a high level of reliability with a simple construction.

Embodiment 1

Gate valves according to preferred embodiments of the present invention will now be described with reference to the drawings.

FIGS. 1A and 1B and FIGS. 2C and 2D show a gate valve according to Embodiment 1 of the present invention, reversibly illustrating the opening and closing operations thereof.

Figure 1A:
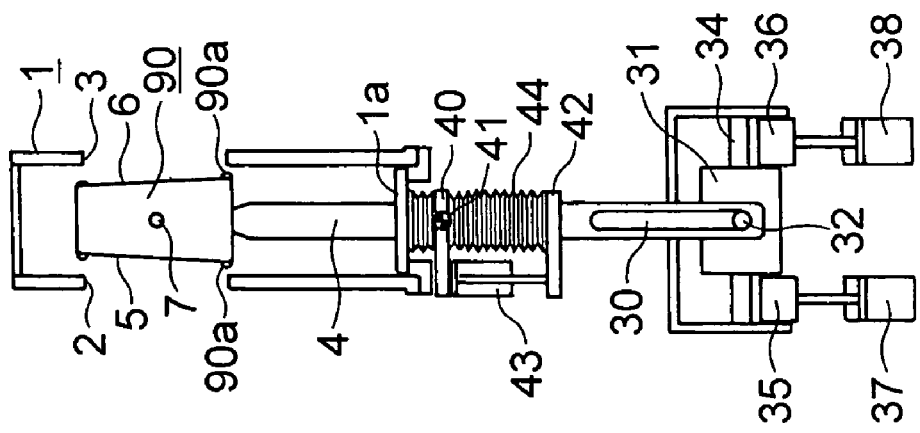
FIGS. 1A and 1B are schematic diagrams showing the construction and operation of a gate valve according to Embodiment 1 of the present invention.
Figure 1B:
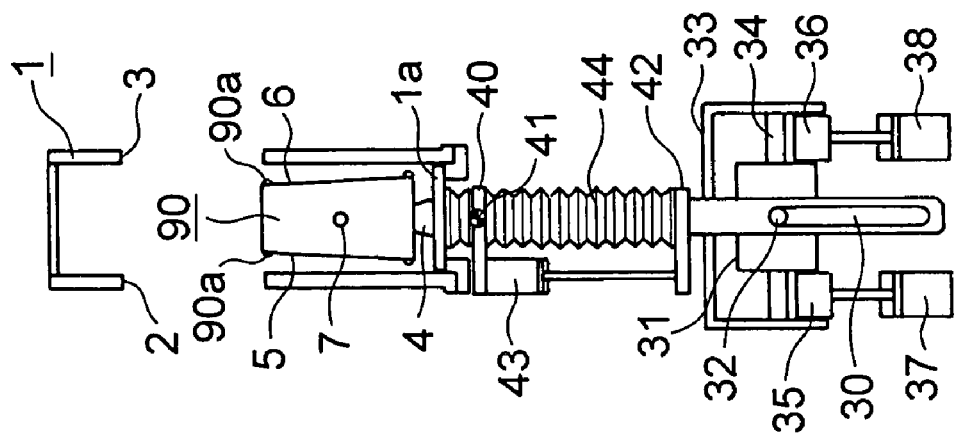

In FIGS. 1A and 1B, reference numeral 1 indicates a valve box generally formed in a box-like configuration and having first and second openings 2 and 3. In the valve box 1, a valve rod 4 is provided so as to be capable of ascending and descending, and, at the upper end of the valve rod 4, there is provided a valve plate 90 having first and second tapered valve plate surfaces 5 and 6 on its sides, with the valve plate 90 being rotatable through a rotatably-supporting portion 7. The valve plate surfaces 5 and 6 are tapered upwards from below.

Figure 11:
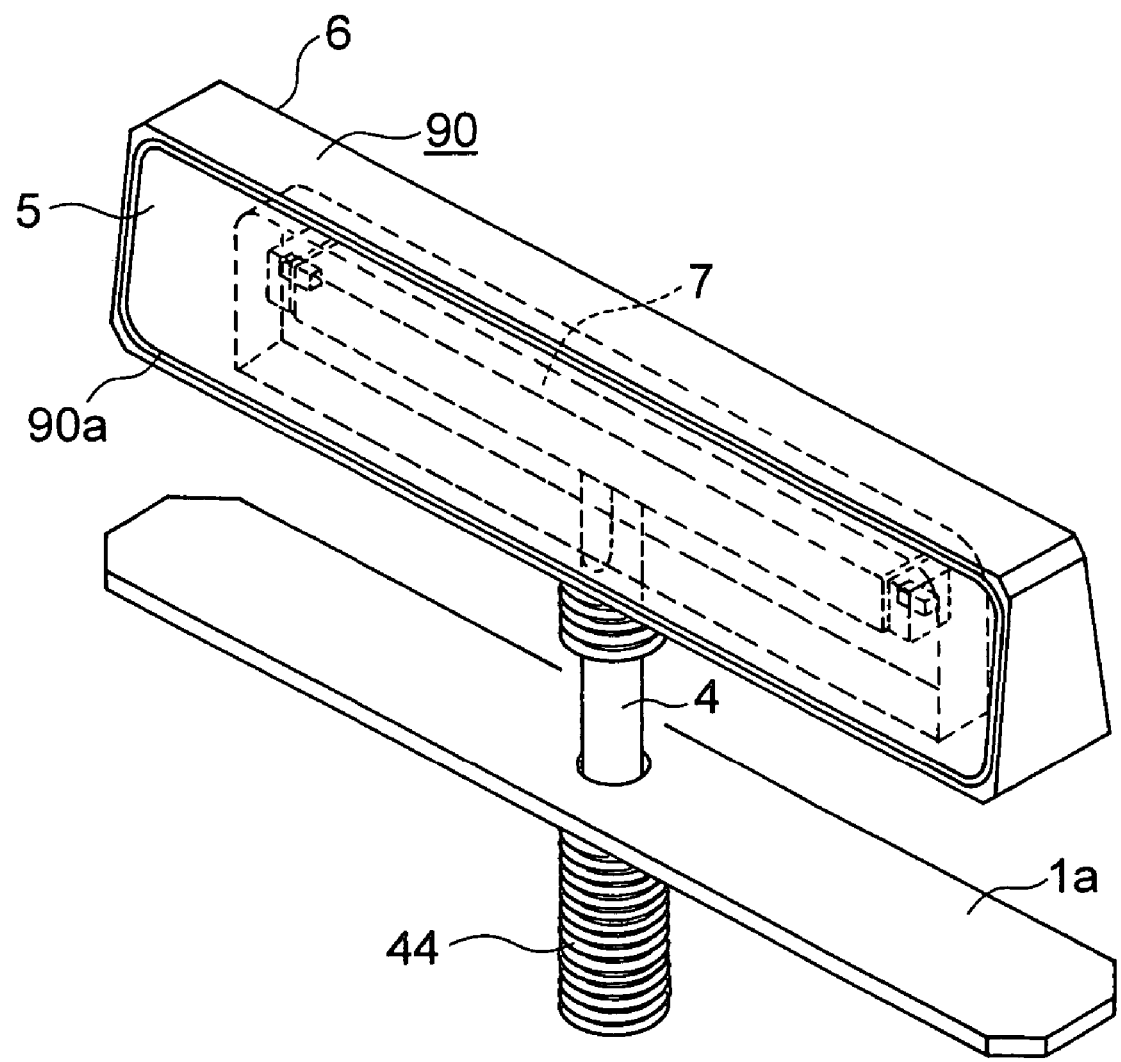
FIG. 11 is an enlarged perspective view showing a gate valve according to the present invention.
Figure 12:
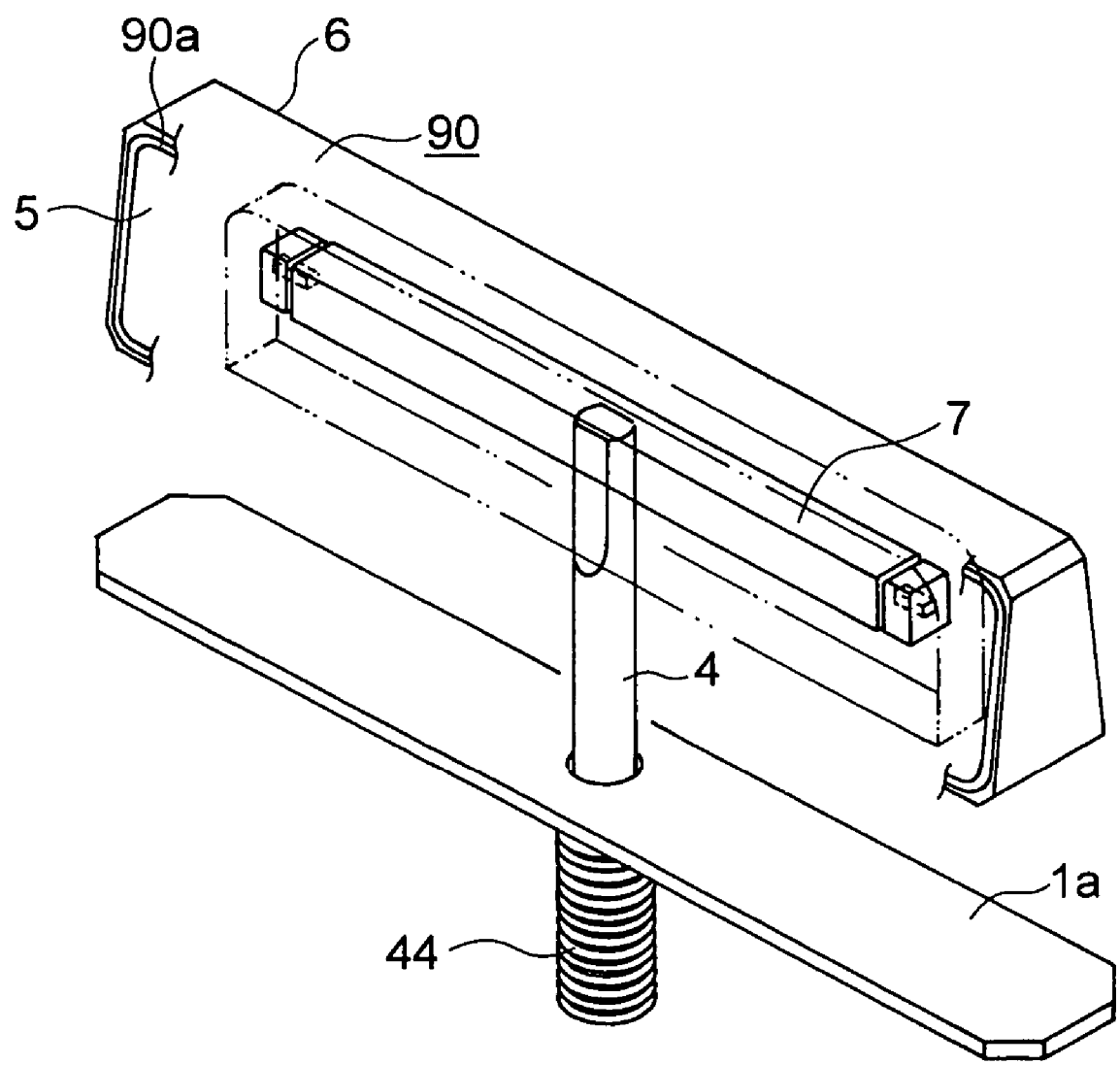
FIG. 12 is a perspective view showing a modification of the gate valve of FIG. 11.

As shown in FIGS. 11 and 12, the valve plate 90, having the valve plate surfaces 5 and 6, is provided so as to be rotatable through the rotatably-supporting portion 7 provided at the top of the valve rod 4. Each of the valve plate surfaces 5 and 6 has an O-ring 90a.

The valve rod 4 extends downwardly through a bottom plate 1a of the valve box 1 so as to be capable of operating, and has in its lower portion an elongated hole 30, which is engaged with a pin 32 of a lateral actuator 31.

The lateral actuator 31 consists of a well-known cylinder type actuator, such as an air type actuator, or an electromagnetic drive type actuator so that the lateral actuator 31 can be moved to the right and left while guided by a lateral bar 34 provided in a frame member 33.

Between the sides of the lateral actuator 31 and the frame member 33, there are situated first and second stoppers 35 and 36, to which first and second lock cylinders 37 and 38 are connected.

Thus, in the case in which the stoppers 35 and 36 are situated between the lateral actuator 31 and the frame member 33 as shown in FIG. 1A, the lateral actuator 31 cannot move laterally, and the valve rod 4 is in a neutral, upright state in which the valve rod 4 does not tilt.

Substantially in the middle of the valve rod 4, there is fixed in position a fixation plate 42, and, between this fixation plate 42 and the bottom plate 1a of the valve box 1, a cylindrical, extendable bellows 44 is provided so as to be cut off the valve rod 4 from the exterior.

Figure 3:
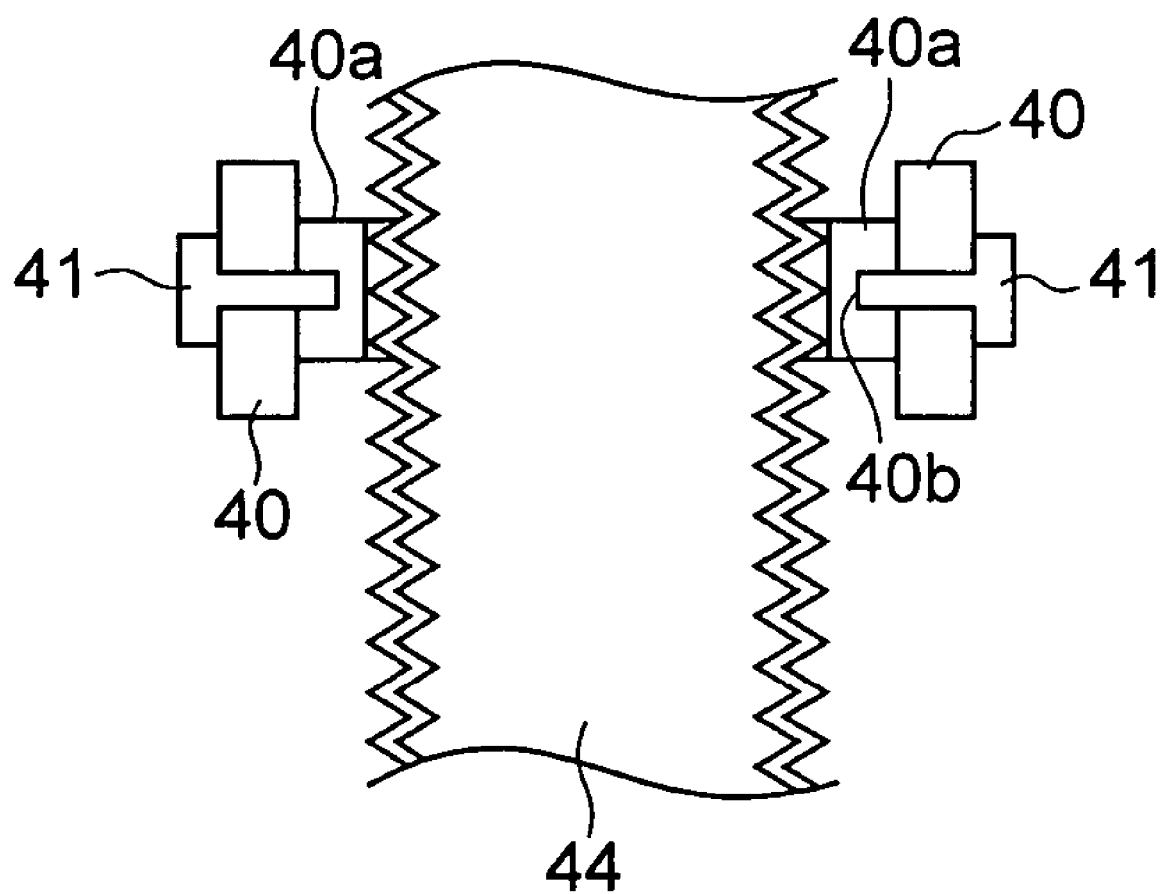
FIG. 3 is a sectional view showing a main portion of the gate valve shown in FIGS. 1A and 1B.

There is arranged a frame-like rotatably-supporting member 40 on the upper portion of the bellows 44. As shown in FIG. 3, inside this rotatably-supporting member 40, there are provided fixing portions 40a fixed to the outer peripheral surface of the bellows 44, and rotatably-supporting portions 41, consisting of pins or the like and provided in the rotatably-supporting member 40, are fitted into support holes 40b of the fixing portions 40a, the valve rod 4 being rotatable around the rotatably-supporting portions 41 together with the bellows 44.

There is provided a raising/lowering cylinder 43 between the rotatably-supporting member 40 and the fixation plate 42.

Next, the operation of this gate valve will be described. First, in the state shown in FIG. 1A, the raising/lowering cylinder 43 is operated, and the valve rod 4 is lowered together with the fixation plate 42, with the valve plate surfaces 5 and 6 being retracted from the openings 2 and 3.

Next, as shown in FIG. 1B, the raising/lowering cylinder 43 is operated for contraction, whereby the bellows 44 is compressed, and the valve rod 4 is raised, with the valve plate surfaces 5 and 6 facing the openings 2 and 3.

As shown in FIG. 2C, in the above-mentioned condition, when the second stopper 36 of the second lock cylinder 38 is retracted, and then the lateral actuator 31 is moved to the right as seen in the drawing, the locking is canceled on one side, and the valve rod 4 is rotated to the right as shown in FIG. 2D, whereby the first valve plate 5 is put onto the first opening 2 to close the first opening 2. As indicated by the arrows in FIGS. 1A through 2D, the valve plate surfaces 5 and 6 can also be operated in the opposite direction.

Embodiment 2

Figure 4:
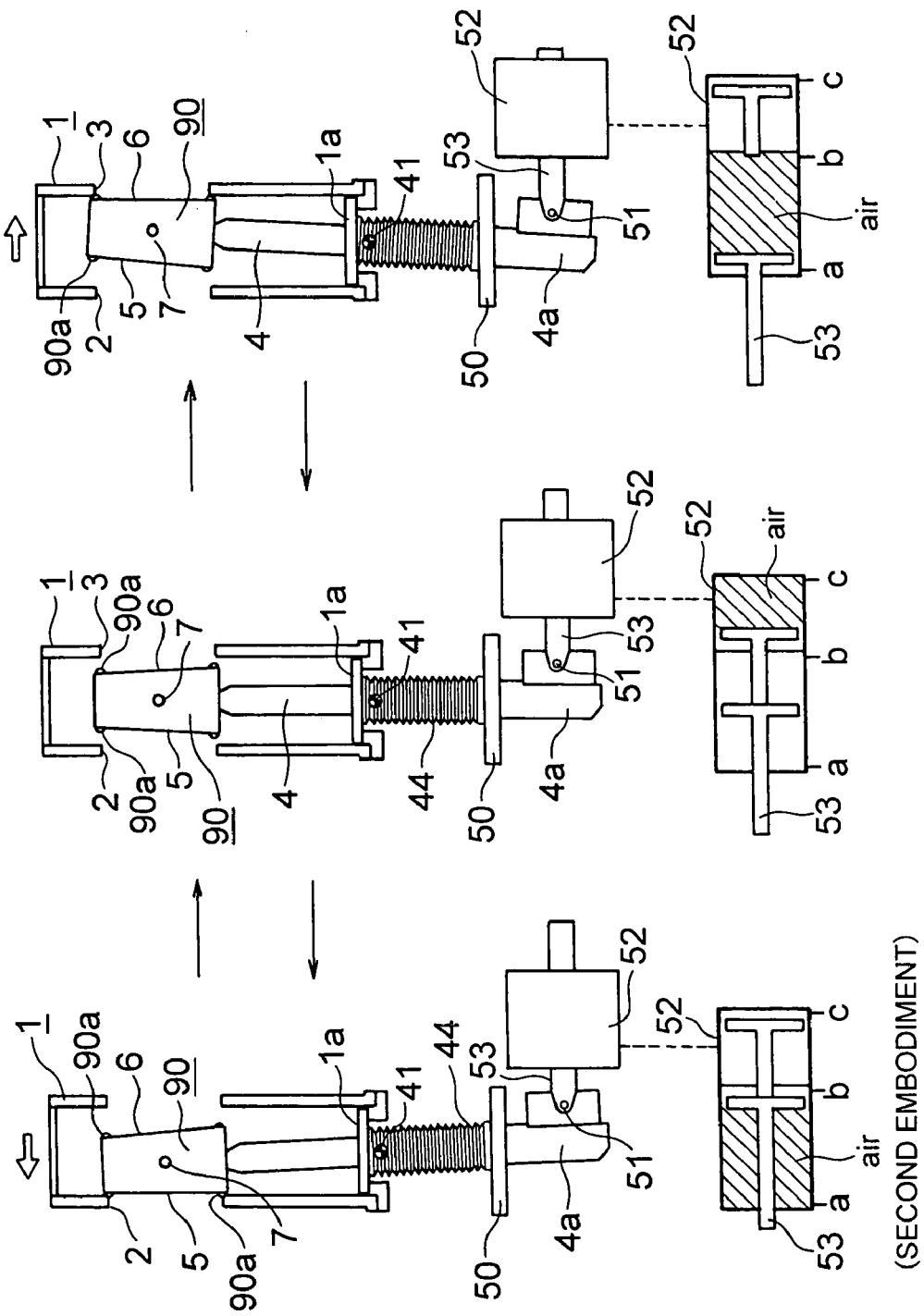
FIGS. 4A through 4C are schematic diagrams showing the construction and operation of a gate valve according to Embodiment 2 of the present invention.
Figure 5:
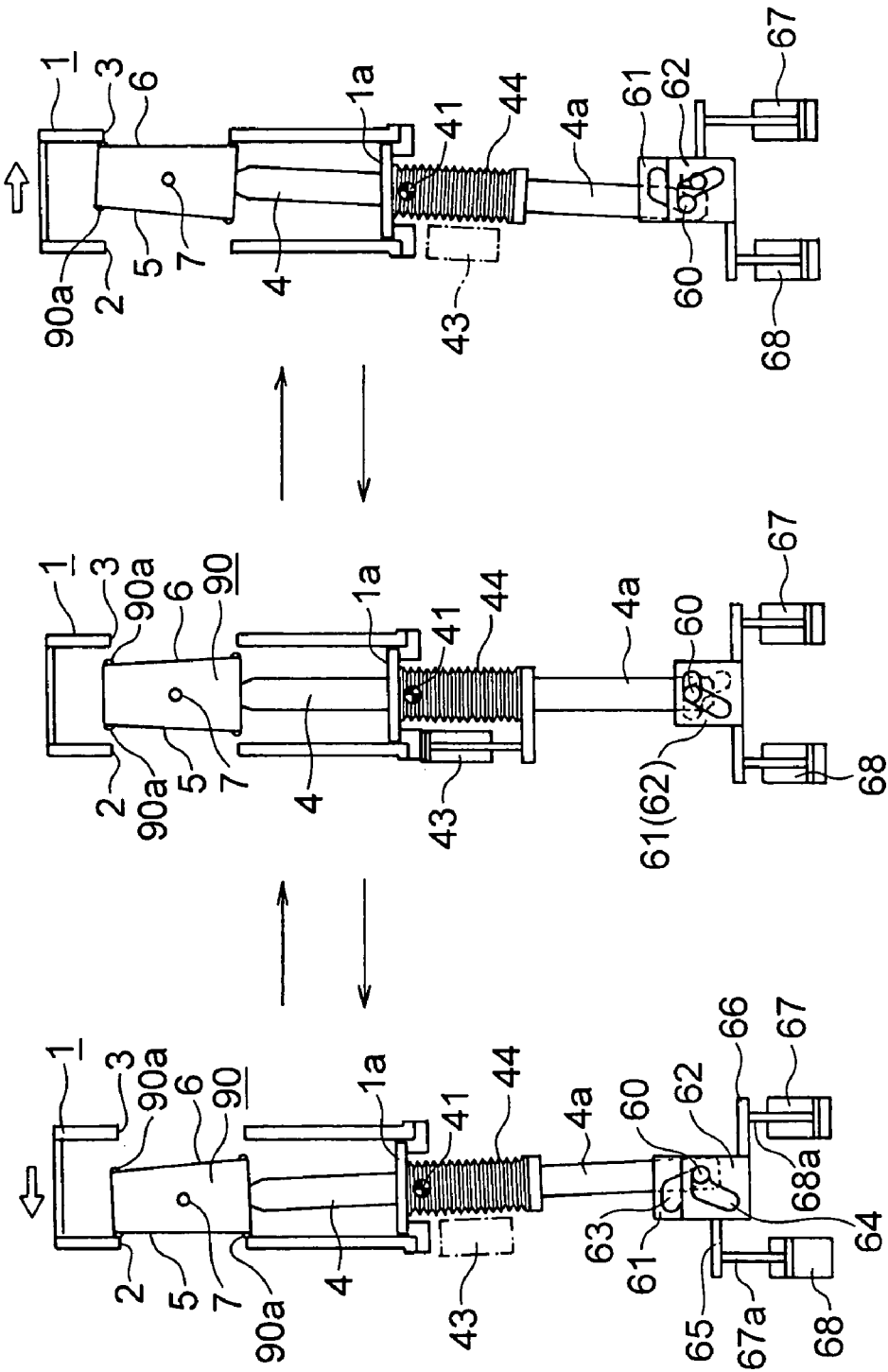
FIGS. 5A through 5C are schematic diagrams showing the construction and operation of a gate valve according to Embodiment 3 of the present invention.
Figure 6:
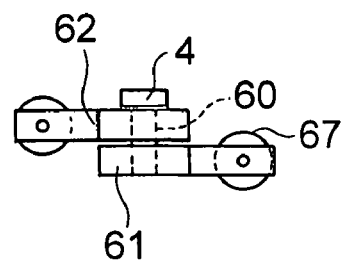
FIG. 6 is a schematic plan view showing a main portion of the gate valve shown in FIGS. 5A through 5C.
Figure 7:
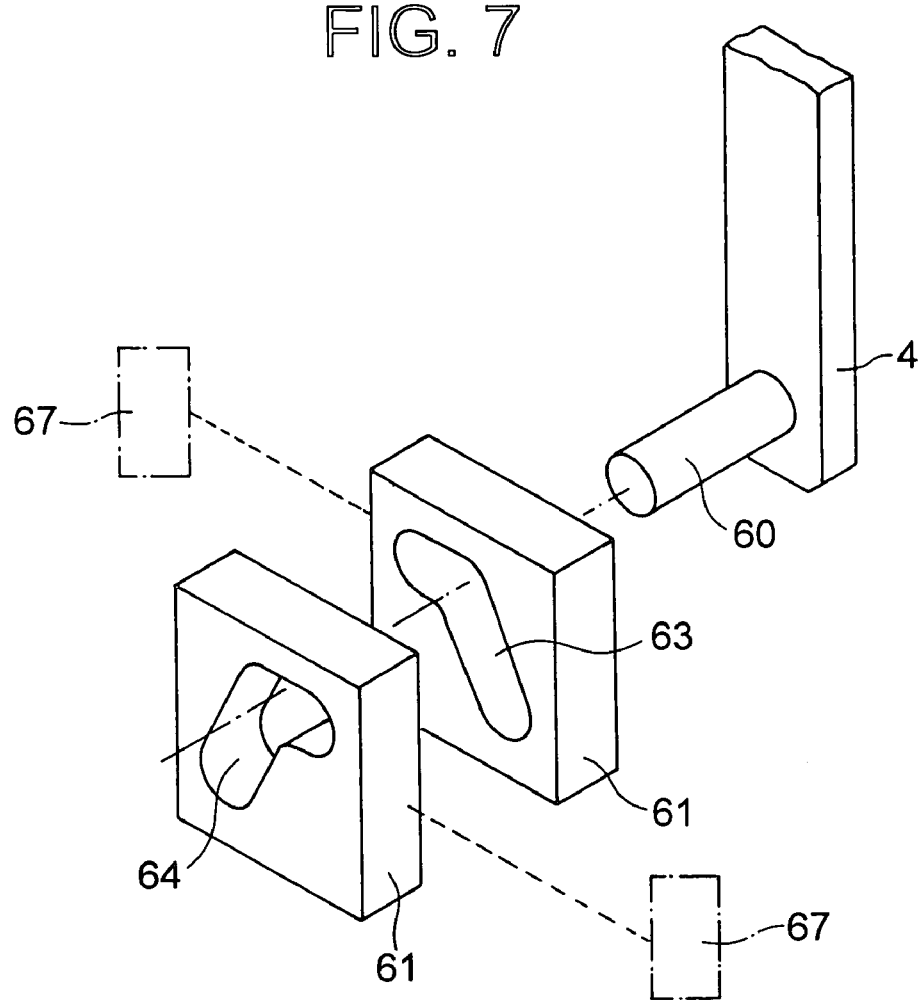
FIG. 7 is an enlarged exploded perspective view showing a main portion of the gate valve shown in FIGS. 5A through 5C.

Next, FIGS. 4A, 4B, and 4C show the construction of a gate valve according to Embodiment 2 of the present invention. The components, which are the same as those of Embodiment 1, are indicated by the same reference numerals, and a description of such components will be omitted. Although not shown in the figure, this embodiment is equipped with the rotatably-supporting member 40, the fixing portions 40a, and the rotatably-supporting portions 41, which are of the same construction as those in FIGS. 1A and 1B. The raising and lowering of the valve rod 4 are not effected by the raising/lowering cylinder 43 of FIGS. 1A and 1B. Instead, an actuator 52 and the valve rod 4 are raised and lowered simultaneously by using a cylinder or the like (not shown).

The lower portion 4a of the valve rod 4 extends through a fixation member 50 so as to be capable of operating, and a rod 53 of the actuator 52 is connected to this lower portion 4a through the intermediation of a rotatably-supporting portion 51.

The actuator 52 consists of a well-known air cylinder (a hydraulic one will do), and has first, second, and third ports a, b, and c allowing stopping at intermediate positions.

Next, the operation of this gate valve will be described. In the state shown in FIG. 4A, air is supplied to the first port a of the actuator 52, so that the above-mentioned lower portion 4a rotates to the right as seen in the drawing, and the first valve plate surface 5 closes the first opening 2.

In the state shown in FIG. 4B, air is supplied to the third port b of the actuator 52, and the valve rod 4 is set at the neutral position, where it makes no rotation. As stated above, the raising and lowering of the valve rod 4 are possible through the cylinder (not shown), with the openings 2 and 3 being open.

In the state shown in FIG. 4C, air is supplied to the second port c of the actuator 52 to cause the rod 53 to stick out, and the above-mentioned lower portion 4a is rotated to the left, whereby the second valve plate surface 6 is put onto the second opening 3 to close the second opening 3.

Thus, as indicated by the arrows in FIGS. 4A through 4C, the opening/closing operation for the valve plate surfaces 5 and 6 is possible in both directions. Thus, the valve plate 90 and the valve rod 4 are arranged in the valve box 1 so as to be capable of laterally reciprocating.

Embodiment 3

FIGS. 5A through 7 are schematic diagrams showing a gate valve according to Embodiment 3. The components, which are the same as, or equivalent to those of FIGS. 1A through 1C are indicated by the same reference numerals, and a description of such components will be omitted. In the following, only the components differing from those of FIGS. 1A through 1C will be described.

Provided on the lower portion 4a of the valve rod 4 is a bar-like protrusion 60, which is passed through and engaged with first and second cam holes 63 and 64 of plate-like first and second cam members 61 and 62 laterally stacked together.

The cam members 61 and 62 each are connected to first and second piston rods 67a and 68a of first and second cam raising/lowering cylinder 67 and 68 through the intermediation of first and second arms 65 and 66.

The first and second cam members 61 and 62 are raised and lowered through selective driving of the first and second cam raising/lowering cylinders 67 and 68, whereby the valve rod 4 and the valve plate 90 are reciprocated laterally to the right or left as shown in FIGS. 5A through 5C, thereby making it possible to open and close the openings 2 and 3 of the valve box 1.

Further, in the state shown in FIG. 5C, the piston rods 67a and 68a of the cam raising/lowering cylinders 67 and 68 are contracted, and the protrusion 60 is situated in the upper portions of the cam holes 63 and 64 of the cam members 61 and 62, with the valve rod 4 being maintained at the neutral position.

Embodiment 4

Figure 8:
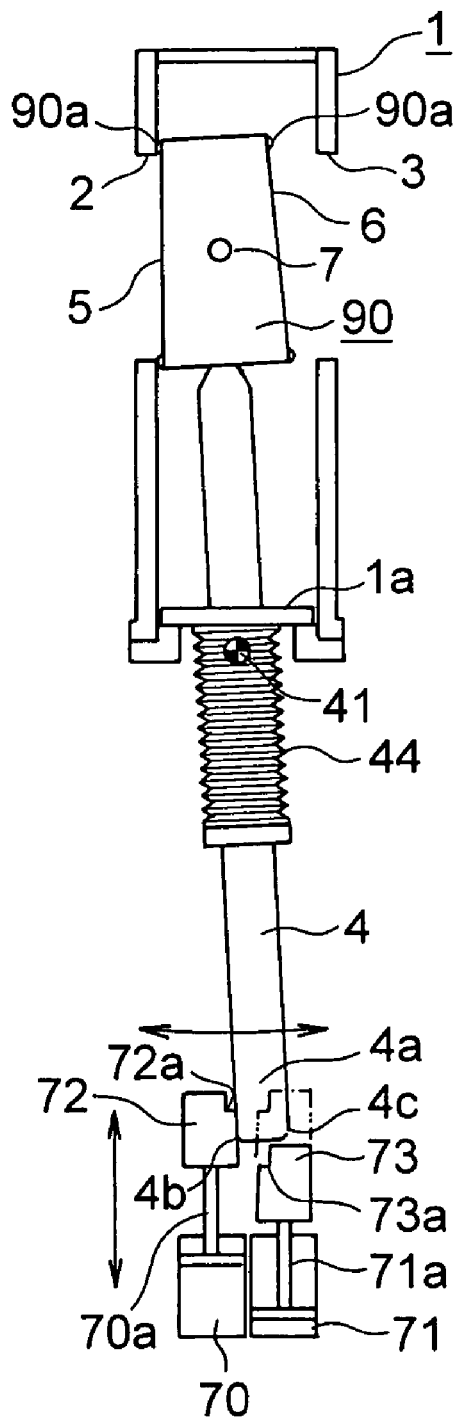
FIG. 8 is a schematic diagram showing a gate valve according to Embodiment 4 of the present invention.

FIG. 8 is a schematic diagram showing a gate valve according to Embodiment 4. The components, which are the same as, or equivalent to those of FIGS. 1A through 1C are indicated by the same reference numerals, and a description of such components will be omitted. In the following, only those portions, which differ from those of FIGS. 1A through 1C, will be described.

A pair of tapered portions 4b and 4c are formed on the sides of the lower portion 4a of the valve rod 4, and there are provided first and second cylinders 70 and 71 below this lower portion 4a, with step portions 72a and 73a of first and second driving blocks 72 and 73 provided on piston rods 70a and 71a of the cylinders 70 and 71 being in contact with the tapered portions 4b and 4c.

Next, the operation of this gate valve will be described. The raising/lowering cylinder, etc. for raising and lowering the valve rod 4, which are of the same construction as those of FIGS. 1A through 1C, are not shown here.

In the state shown in FIG. 8, the first driving block 72 is raised, and the second driving block 73 is lowered. The first driving block 72 is put onto the left-hand side of the lower portion 4a, whereby the valve rod 4 is tilted to the left, and the first opening 2 is closed by the first valve plate surface 5.

In contrast to the case shown in FIG. 8, when solely the second driving block 73 is raised, the valve rod 4 is tilted to the right, and the second opening 3 is closed by the second valve plate surface 6. Further, in the state in which the driving blocks 72 and 73 are lowered, the lower portion 4a is situated above the step portions 72a and 73a, and the valve rod 4 is in the neutral state, where it makes no tilting movement.

Further, when the valve rod 4 is to be raised or lowered, the cylinders 70 and 71 are retracted laterally by a moving means (not shown) to thereby allow the valve rod 4 to be raised or lowered.

Figure 9:
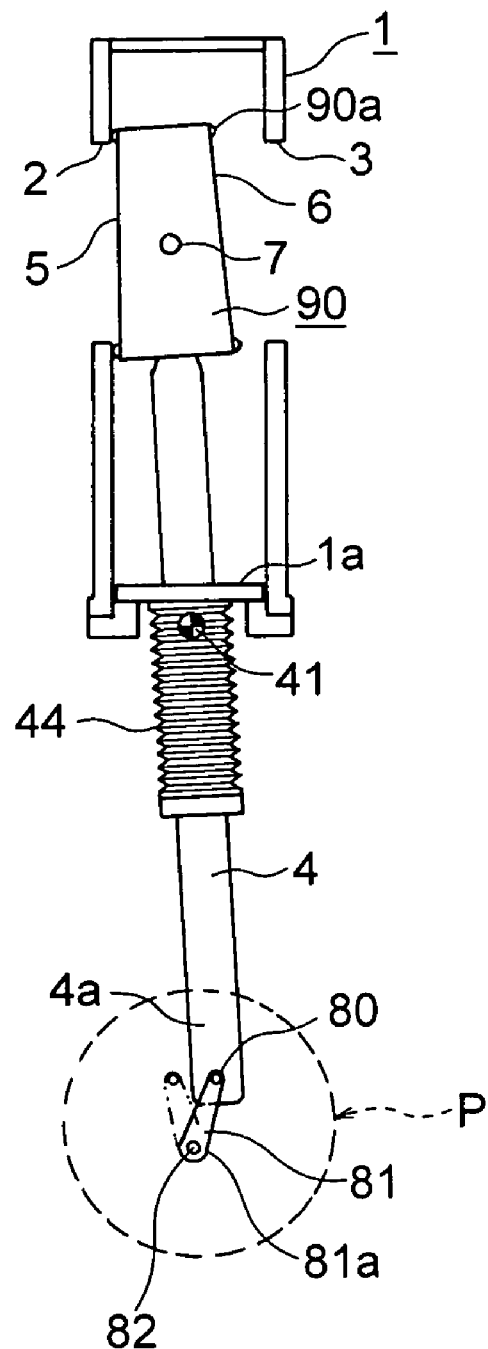
FIG. 9 is a schematic diagram showing a gate valve according to Embodiment 5 of the present invention.
Figure 10:
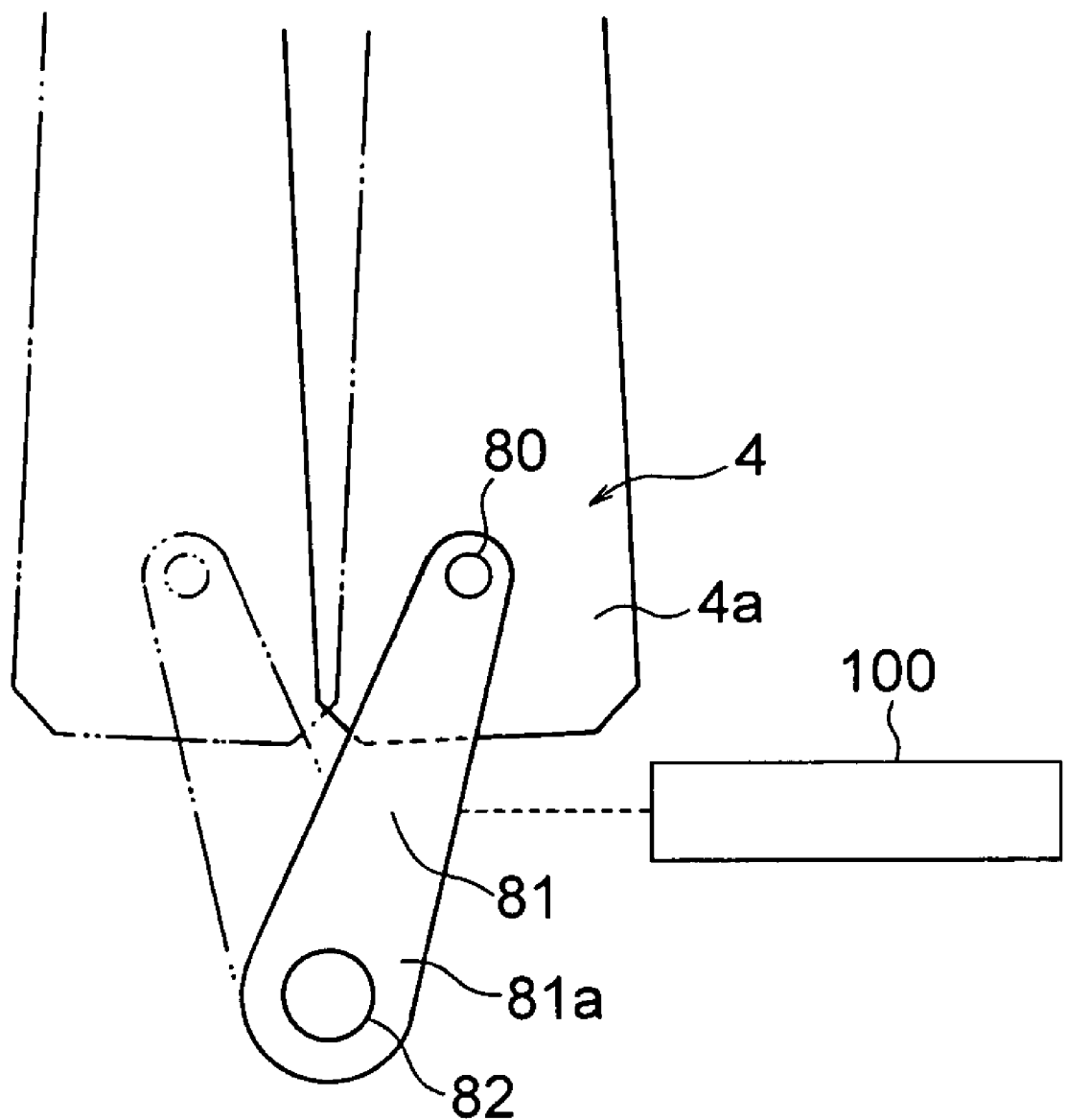
FIG. 10 is an enlarges schematic diagram showing portion P of the gate valve shown in FIG. 9.

FIG. 9 is a schematic diagram showing a gate valve according to Embodiment 5. The components, which are the same as, or equivalent to those of FIGS. 1A through 1C are indicated by the same reference numerals, and a description of such components will be omitted.

In this embodiment, a connection member 81 is connected to the lower portion 4a of the valve rod 4 through the intermediation of a lower rotatably-supporting portion 80, and a base portion 81a of this connection member 81 is rotatably supported by a base rotatably-supporting portion 82.

By selectively rotating the connection member 81 to the right or left by a well-known driving means (not shown), such as a cylinder, motor, or actuator, it is possible to rotate the valve rod 4.

Figure 13A:
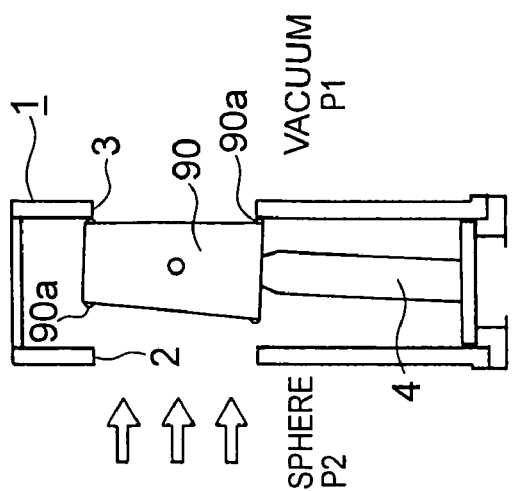
FIGS. 13A through 13C are explanatory diagrams illustrating the operation of a gate valve according to the present invention.
Figure 13B:
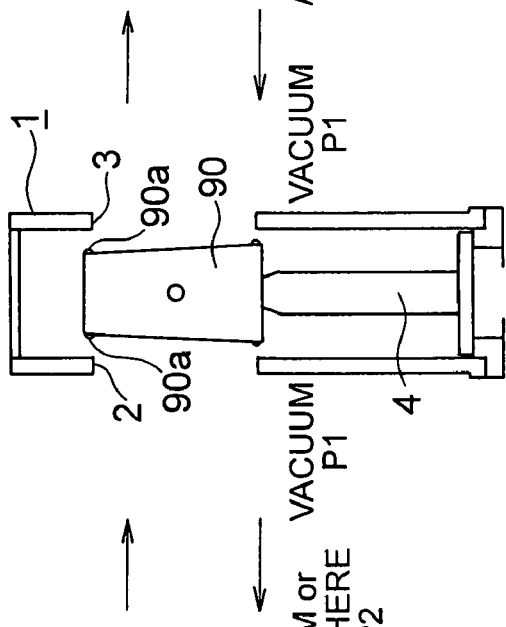
Figure 13C:
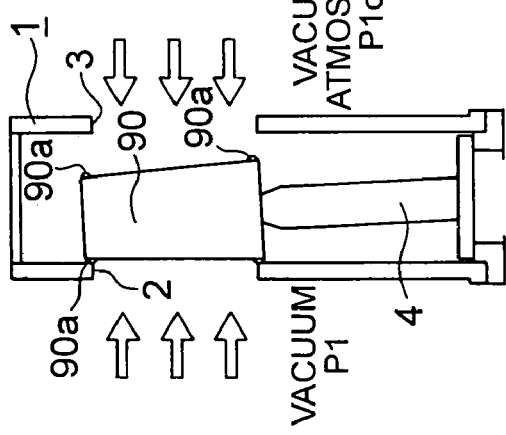

Further, the operation of raising and lowering the valve rod 4 can be effected by using the raising/lowering cylinder 43 of FIGS. 1A through 1C or the like. FIGS. 13A through 13C show the operation of the valve plate 90 in the above embodiments in contrast with that of the conventional example as shown in FIGS. 14A through 14C. That is, FIGS. 13A through 13C show how O-rings 90a provided on the valve plate surfaces 5 and 6 are alternately used.

It should be noted that, apart from a vacuum gate valve, the present invention is also applicable to gate valves to be opened and closed for general transportation purposes.

What is claimed is:

1. A gate valve comprising:

a valve rod provided so as to be capable of rotating a valve plate having first and second tapered valve plate surfaces capable of ascending and descending in a valve box having first and second openings;

a rotatably-supporting member for rotatably supporting the valve rod;

a raising/lowering cylinder provided on the rotatably-supporting member and adapted to raise and lower the valve rod;

a pin engaged with an elongated hole of the valve rod;

a lateral actuator having the pin and capable of reciprocating in a lateral direction perpendicular to the longitudinal direction of the rod;

first and second stoppers provided on the sides of the lateral actuator; and first and second lock cylinders connected to the first and second stoppers, wherein one of the lock cylinders is operated, with the valve rod raised by the raising/lowering cylinder, to thereby cancel the engagement between the second stopper and the lateral actuator, and wherein, by laterally moving the lateral actuator, the valve rod is tilted to thereby put one of the first and second valve plate surfaces onto one of the first and second openings to close the gate valve.

2. A gate valve according to claim 1, wherein the lateral actuator is guided by a lateral bar provided in a fixedly arranged frame member, and wherein the first and second stoppers are arranged between the side portions of the lateral actuator and the frame member.

* * * * *